(12) United States Patent
Brown et al.

(10) Patent No.: US 8,091,076 B2
(45) Date of Patent: Jan. 3, 2012

(54) DYNAMIC NATIVE BINDING

(75) Inventors: Alexander B. Brown, Sheffield (GB);
Geraint M. North, Manchester (GB);
Frank Thomas Weigel, Manchester
(GB); Gareth Anthony Knight,
Cheshire (GB)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 12/237,945

(22) Filed: Sep. 25, 2008

(65) Prior Publication Data

US 2009/0100416 A1 Apr. 16, 2009

Related U.S. Application Data

(63) Continuation of application No. 10/748,317, filed on Dec. 29, 2003, now Pat. No. 7,434,209.

(30) Foreign Application Priority Data

Jul. 15, 2003 (GB) .................................. 0316531.3
Sep. 4, 2003 (GB) .................................. 0320717.2

(51) Int. Cl.
*G06F 9/45* (2006.01)
(52) U.S. Cl. ...................................................... 717/136
(58) Field of Classification Search .................. 717/136, 717/137
See application file for complete search history.

(56) References Cited

U.S. PATENT DOCUMENTS

| 5,937,193 A | 8/1999 | Evoy | |
|---|---|---|---|
| 6,199,202 B1 | 3/2001 | Coutant et al. | |
| 6,606,742 B1 * | 8/2003 | Orton et al. | 717/140 |
| 6,810,517 B2 * | 10/2004 | Bond et al. | 717/138 |
| 7,360,206 B1 * | 4/2008 | Hatcher | 717/139 |
| 2002/0095661 A1 * | 7/2002 | Angel et al. | 717/130 |
| 2003/0101334 A1 * | 5/2003 | Desoli | 712/227 |
| 2004/0015911 A1 * | 1/2004 | Hinsley et al. | 717/147 |
| 2005/0028137 A1 * | 2/2005 | Evans et al. | 717/110 |
| 2005/0086451 A1 * | 4/2005 | Yates et al. | 712/32 |
| 2005/0238334 A1 * | 10/2005 | Inoue et al. | 386/125 |
| 2005/0240907 A1 * | 10/2005 | Renouf | 717/136 |
| 2006/0170967 A1 * | 8/2006 | Maki et al. | 358/1.15 |
| 2006/0271921 A1 * | 11/2006 | Cronce et al. | 717/151 |
| 2009/0031324 A1 * | 1/2009 | Shenfield et al. | 719/313 |

FOREIGN PATENT DOCUMENTS

| EP | 1316882 | 6/2003 |
|---|---|---|
| JP | 2000330792 | 11/2000 |
| WO | WO-02/052409 | 7/2002 |
| WO | 03036475 | 5/2003 |

OTHER PUBLICATIONS

Kernighan et al.; "The C Programming Language"; 1988; chapters 1.7 and 1.8.
European Search Report issued for European Patent Application 08165859.3-1243, dated Nov. 21, 2008.
Lemay et al.; Teach Yourself JAVA in 21 Days; 1996; pp. 403-419 (Lesson 20: Native Methods and Libraries).

* cited by examiner

*Primary Examiner* — Anna Deng
(74) *Attorney, Agent, or Firm* — Matthew B. Talpis; James L. Baudino

(57) ABSTRACT

A native binding technique is provided for insetting calls to native functions during translation of subject code to target code, such that function calls in the subject program to subject code functions are replaced in target code with calls to native equivalents of the same functions. Parameters of native function calls are transformed from target code representations to be consistent with native code representations, native code calling conventions, and native function prototypes.

32 Claims, 4 Drawing Sheets

DYNAMIC NATIVE BINDING

CROSS REFERENCE TO RELATED APPLICATIONS

This application claims benefit to GB Patent Application No. 0316531.3, filed Jul. 15, 2003 and GB Patent Application No. 0320717.2, filed Sep. 4, 2003 and U.S. patent application Ser. No. 10/748,317, filed Dec. 29, 2003.

BACKGROUND

1. Technical Field

The subject invention relates generally to the field of computers and computer software and, more particularly, to program code conversion methods and apparatus useful, for example, in code translators, emulators and accelerators which translate program code that includes function calls.

2. Description of Related Art

In both embedded and non-embedded CPU's, one finds predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such architectures would benefit from "Synthetic CPU" co-architecture.

Program code conversion methods and apparatus facilitate such acceleration, translation and co-architecture capabilities and are addressed, for example, in the co-pending U.S. patent application Ser. No. 10/439,966, entitled Block Translation Optimizations for Program Code Conversion and filed on May 16, 2003, the disclosure of which is hereby incorporated by reference.

A subject program to be translated usually consists of multiple units of subject code, including the subject executable itself and a number of subject libraries, some of which may be proprietary and some of which are provided as part of the subject OS ("system libraries"). As the subject program runs, control flow passes between these different units of subject code as function calls are made to external libraries. In some circumstances, native (i.e., target architecture) versions of certain subject libraries may be available on the target architecture.

SUMMARY

The following is a summary of various aspects and advantages realizable according to various embodiments according to the invention. It is provided as an introduction to assist those skilled in the art to more rapidly assimilate the detailed design discussion that ensues and does not and is not intended in any way to limit the scope of the claims that are appended hereto.

In particular, the inventors have developed an optimization technique directed at expediting program code conversion, particularly useful in connection with a run-time translator which employs translation of subject program code into target code. A native binding technique is provided for inserting calls to native functions during translation of subject code to target code, such that function calls in the subject program to subject code functions are replaced in target code with calls to native equivalents of the same functions. Parameters of native function calls are transformed from target code representations to be consistent with native code representations, native code calling conventions, and native function prototypes.

Native binding is the mechanism of the present invention that enables translated subject code to execute a native (i.e., target architecture) version of a unit of code directly, rather than translating and executing the equivalent subject code, such as, for instance, a native version of a library. This avoids the overhead of translating the subject versions of those libraries. In addition, the native version may be a much more efficient implementation of the same functionality, as the native version can exploit architectural features of the target architecture which the subject version is unaware of.

BRIEF DESCRIPTION OF THE DRAWINGS

The accompanying drawings, which are incorporated in and constitute a part of the specification, illustrate presently preferred implementations and are described as follows.

DETAILED DESCRIPTION

Figure 1:
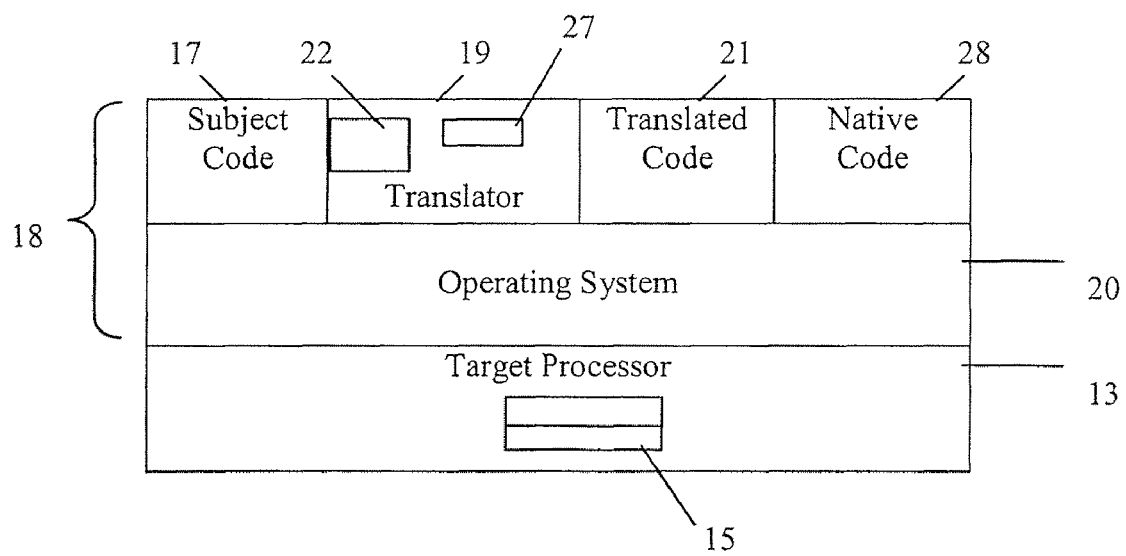
FIG. 1 is a block diagram of apparatus wherein embodiments of the invention find application.

Illustrative apparatus for implementing various novel features discussed below is shown in FIG. 1. FIG. 1 illustrates a target processor 13 including target registers 15 together with memory 18 storing a number of software components 17, 19, 20, 21, 22 and 28. The software components include subject code 17 to be translated, an operating system 20, the translator code 19, the translated code 21, the global register store 27, a native binding mechanism 22, and the native code 28. Translated code 21 is also referred to as target code 21. The global register store 27 is also referred to as the subject register bank 27. The translator code 19 may function, for example, as an emulator translating subject code of one ISA into translated code of another ISA or as an accelerator for translating subject code into translated code, each of the same ISA. Native code 28 is code compiled directly for the target processor 13.

The translator 19, i.e., the compiled version of the source code implementing the translator, and the translated code 21, i.e., the translation of the subject code 17 produced by the translator 19, run in conjunction with the operating system 20 running on the target processor 13, typically a microprocessor or other suitable computer. It will be appreciated that the structure illustrated in FIG. 1 is exemplary only and that, for example, software, methods and processes according to the invention may be implemented in code residing within or beneath an operating system. The subject code 17, translator code 19, operating system 20, and storage mechanisms may be any of a wide variety of types, as known to those skilled in the art.

As used herein, there is a distinction between "target code" 21, which results from the run-time translation of a subject code 17 fragment, and "native code" 28, which is compiled directly for the target architecture. The system target libraries provided by the target operating system are an example of native code 28. The translation of a system subject library is an example of target code 21. Native code 28 is generated external to the translator 19, meaning that the translator 19 does not generate the native node 28 nor does the translator 19 have an opportunity to optimize the native code 28.

In the apparatus according to FIG. 1, program code conversion is preferably performed dynamically, at run-time, while the target code 21 is running. The translator 19 runs inline with the translated program 21. The translator 19 described above is typically employed as an application compiled for the target architecture. The subject program 17 is translated by the translator 19 at run-time to execute directly on the target architecture. The translator 19 also transforms subject operating system (OS) calls made by the subject program 17 so that they work correctly when passed to the target OS 20.

In the process of generating the target code 21, intermediate representation ("IR") trees are generated based on the subject instruction sequence. IR trees are abstract representations of the expressions calculated and operations performed by the subject program. Later, target code 21 is generated based on the IR trees.

The collections of IR nodes described herein are colloquially referred to as "trees". We note that, formally, such structures are in fact directed acyclic graphs (DAGs), not trees. The formal definition of a tree requires that each node have at most one parent. Because the embodiments described use common subexpression elimination during IR generation, nodes will often have multiple parents. For example, the IR of a flag-affecting instruction result may be referred to by two abstract registers, those corresponding to the destination subject register and the flag result parameter.

For example, the subject instruction "add %r1, %r2, %r3" performs the addition of the contents of subject registers %r2 and %r3 and stores the result in subject register %r1. Thus, this instruction corresponds to the abstract expression "%r1=%r2+%r3". This example contains a definition of the abstract register %r1 with an add expression containing two subexpressions representing the instruction operands %r2 and %r3. In the context of a subject program 17, these subexpressions may correspond to other, prior subject instructions, or they may represent details of the current instruction such as immediate constant values.

When the "add" instruction is parsed, a new "+" IR node is generated, corresponding to the abstract mathematical operator for addition. The "+" IR node stores references to other IR nodes that represent the operands (represented in the IR as subexpression trees, often held in subject registers). The "+" node is itself referenced by the subject register whose value it defines (the abstract register for %r1, the instruction's destination register). For example, the center-right portion of FIG. 20 shows the IR tree corresponding to the X86 instruction "add %ecx, %edx".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract registers. These abstract registers correspond to specific features of the subject architecture. For example, there is a unique abstract register for each physical register on the subject architecture ("subject register"). Similarly, there is a unique abstract register for each condition code flag present on the subject architecture. Abstract registers serve as placeholders for IR trees during IR generation. For example, the value of subject register %r2 at a given point in the subject instruction sequence is represented by a particular IR expression tree, which is associated with the abstract register for subject register %r2. In one embodiment, an abstract register is implemented as a C++ object, which is associated with a particular IR tree via a C++ reference to the root node object of that tree.

The implementation of abstract registers is divided between components in both the translator code 19 and the target code 21. Within the translator 19, an "abstract register" is a placeholder used in the course of IR generation, such that the abstract register is associated with the IR tree that calculates the value of the subject register to which the particular abstract register corresponds. As such, abstract registers in the translator may be implemented as a C++ object which contains a reference to an IR node object (i.e., an IR tree). The aggregate of all IR trees referred to by the abstract register set is referred to as the working IR forest ("forest" because it contains multiple abstract register roots, each of which refers to an IR tree). The working IR forest represents a snapshot of the abstract operations of the subject program at a particular point in the subject code.

In basic block mode, state is passed from one basic block to the next using a memory region which is accessible to all translated code sequences, namely, a global register store 27. The global register store 27 is a repository for abstract registers, each of which corresponds to and emulates the value of a particular subject register or other subject architectural feature. During the execution of target code 21, abstract registers are held in target registers so that they may participate in instructions. During the execution of translator code 21, abstract register values are stored in the global register store 27 or target registers 15.

Within the target code 21, an "abstract register" is a specific location within the global register store, to and from which subject register values are synchronized with the actual target registers. Alternatively, when a value has been loaded from the global register store, an abstract register in the target code 21 could be understood to be a target register 15, which temporarily holds a subject register value during the execution of the target code 21, prior to being saved back to the register store.

Thus, a subject program running under the translator 19 has two different types of code that execute in an interleaved manner: the translator code 19 and the target code 21. The translator code 19 is generated by a compiler, prior to run-time, based on the high-level source code implementation of the translator 19. The target code 21 is generated by the translator code 19, throughout run-time, based on the subject code 17 of the program being translated.

The representation of the subject processor state is likewise divided between the translator 19 and target code 21 components. The translator 19 stores subject processor state in a variety of explicit programming language devices such as variables and/or objects; the compiler used to compile the translator determines how the state and operations are implemented in target code. The target code 21, by comparison, stores subject processor state implicitly in target registers and memory locations, which are manipulated directly by the target instructions of the target code 21.

For example, the low-level representation of the global register store 27 is simply a region of allocated memory. This is how the target code 21 sees and interacts with the abstract registers, by saving and restoring between the defined memory region and various target registers. In the source code of the translator 19, however, the global register store 27 is a data array or an object which can be accessed and manipulated at a higher level. With respect to the target code 21, there simply is no high-level representation.

Figure 2:
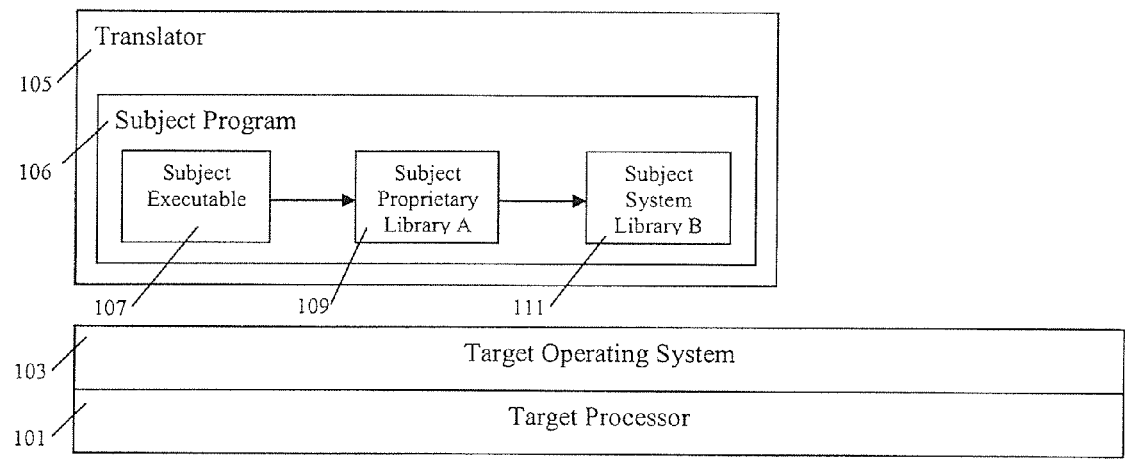
FIG. 2 is a schematic diagram illustrating native binding processes in accordance with an illustrative embodiment of the invention.

FIGS. 2-5 show various illustrative embodiments of the translator 19 of FIG. 1. FIG. 2 shows an illustrative embodiment of the different compilation units of a subject program 106 in the subject code 17 to be translated by a translator 105. The translator 105 runs as an executable compiled for the native architecture (otherwise referred to as the target architecture), where the native architecture includes both the native OS 103 and the native processor 101 (which are equivalent to the target OS 20 and the target processor 13 of FIG. 1). The subject program 106 in this example includes a subject executable 107 and a number of subject libraries, which may include subject proprietary libraries 109 and subject system libraries 111. When native binding is not employed, the compilation units of the subject program 106 are translated into target code 21 and executed within the translator 105.

Figure 3:
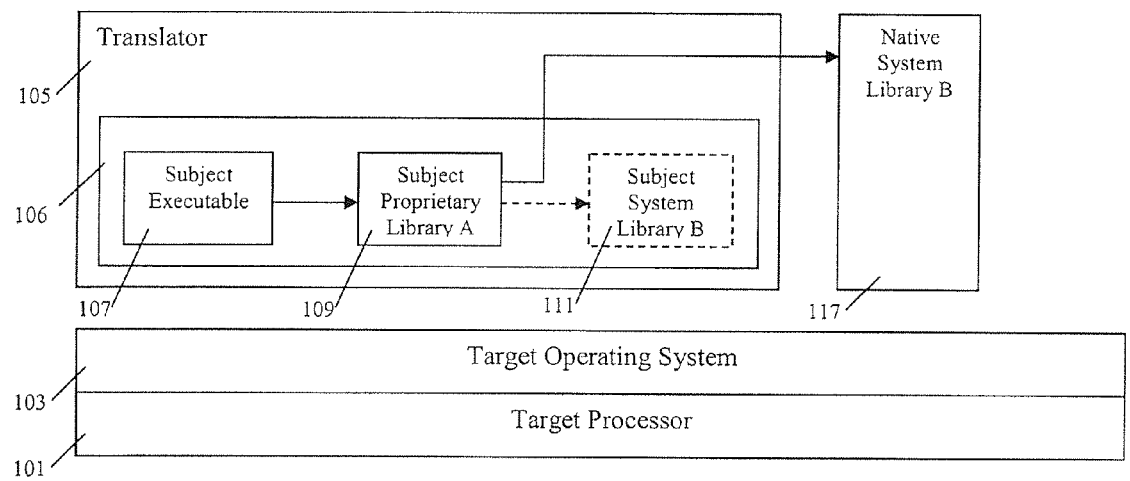
FIG. 3 is a schematic diagram illustrating native binding processes in accordance with an illustrative embodiment of the invention.

FIG. 3 shows a block diagram of the operational flow of an illustrative embodiment where native binding is utilized on the units of code of a translated program. The subject program 106 includes a subject executable 107 and a number of subject libraries, including proprietary libraries 109 and system libraries 111. The translator 105 uses native binding to replace subject program 106 calls to subject system library functions 111 with calls to functions in a native system library 117.

For example, for a MIPS-x86 translation, the x86 system target library "libc" may define an advanced memcpy( ) (memory copy) routine that takes advantage of SSE2 vector operations to perform extremely fast byte copies. Using the native binding mechanism 22 described in this application, all calls to memcpy in the MIPS subject code are bound to the native memcpy( ). This eliminates the cost of translating the subject (MIPS) version of the memcpy( ) function. In addition, the native (x86) version of memcpy( ) function has a much greater awareness of the intricacies of the native hardware, so it will know the most efficient way to achieve the function's desired effect.

Native binding is implemented by the translator 19 when it is detected that the subject program's flow of control enters a section of subject code 17, such as a subject library, for which a native version of the subject code exists. Rather than translating the subject code 17, the translator 19 executes equivalent native code 28.

In addition to target system library calls, native binding may be used for more arbitrary code substitution, such as substituting a natively compiled version of a non-library function. Furthermore, native binding may be used to implement subject system calls on a native architecture, by replacing all calls to subject system functions with substitute native functions that either implement the same functionality as the calls to subject system functions or act as call stubs around target system calls. Native binding may also be applied at arbitrary subject code locations, beyond function call sites, to allow arbitrary code sequences (in either target code or native code) and/or function calls to be inserted or substituted at any well-defined point in the subject program.

Bind Point Descriptions

The native binding mechanism 22 requires the translator 19 to correlate particular subject code 17 functions with their native code 28 counterparts, so that the translator 19 knows which subject functions to bind and to which native functions to bind them. The translator 19 can acquire this function mapping information in different ways depending on the implementation of native binding mechanism 22.

In one embodiment, the subject function to be bound is identified using a special purpose "bind point" description language. A bind point description includes: (a) the subject function to be bound and (b) the corresponding native function to be bound. The translator 19 reads bind point descriptions at the beginning of execution to identify bind points (locations to invoke native functions). During decoding of the subject program, when the translator 19 encounters these bind points, the translator 19 inserts in the target code 21 a call stub to the appropriate native function. In one embodiment, particular bind point descriptions are embedded in the translator 19. In another embodiment, bind point descriptions are stored in separate files which the translator 19 reads at run-time, thus allowing end-users to control the native binding mechanism 22 by adding particular subject-to-native function mappings.

In another embodiment, the native binding bind point description language allows arbitrary bind points to be specified, such that a native function call can be inserted at other points in the subject code beyond subject function calls. In this embodiment, a bind point description includes: (a) a defined location within the subject program (i.e., not just function call sites) and (b) the corresponding native function to be bound. For example, arbitrary bind points may be identified as: (1) the start of a function; (2) the start of a subject module's initialization code; (3) a fixed offset from a particular symbol (e.g., a fixed offset from the start of a function); (4) a fixed offset from the first text segment in a module; or (5) all calls to a particular subject function (either within a particular module, or in all modules excluding one particular module). The difference between bind point types (1) and (5) is that (1) binds the entry point of a subject function while (5) binds the function's call site.

In some embodiments, the native binding bind point description language allows the end-user to specify relative bind points, where a native function call can be inserted before, after, or instead of a bind point (e.g., a system subject function call). For example, a native binding bind point description could specify that the native function "foo( )" be invoked immediately after all calls to the subject function "bar( )".

The bind point description language may also be used to insert code other than native function calls at bind points. In such embodiments, a bind point description includes: (a) a defined location within the subject program and (b) a reference to target code block or a native code function to be invoked. If the code inserted is target code 21, then the translator 19 does not need to perform much of the work associated with parameter transformation and native calling conventions (described below) at the bind point, where adherence to the translator-specific target code calling conventions is sufficient. Arbitrary target and native code insertion allows the translator 19 to perform other tasks on translated programs, such as debugging and performance profiling.

In an alternative embodiment, subject-to-native function mappings are encoded in the symbol table of the subject program before run-time in a process referred to as runtime symbol patching. Runtime symbol patching replaces entries in the subject program's symbol table with special native binding markers. This requires manipulation of the subject program after it is compiled (compile-time), but before it is translated (run-time). When the translator 19 encounters symbol table markers at run-time, the translator 19 interprets the symbol table markers as bind point descriptions and interprets them to identify which native function to call. In this embodiment, the identity of the subject function to be bound is implicit in the location of the symbol table marker within the symbol table, because the symbol table marker is placed in the symbol table entry corresponding to a particular subject function.

Instead of explicitly identifying bind points by bind point descriptions, bind points may alternatively be identified implicitly by a translator specific subject instruction set extension which is planted in the subject code when it is compiled (see "S-calls" below).

Parameter Transformation

When invoking a native function, the translator 19 must conform to the calling conventions of the target architecture. By comparison, target code 21 does not necessarily need to adhere to the target architecture calling conventions as long as the translator 19 adheres to some consistent calling convention throughout the target code 21. In addition, the translator 19 may need to perform data transformation between the subject machine state (as represented in target code 21) and the native machine state (as represented in native code 28), both for the native function's input parameters and its return value if any. Examples of such data transformations may include: (i) endian conversion (i.e., byte-swapping); (ii) data structure alignment; (iii) conversion between subject addresses and target addresses; and (iv) value transformation (e.g., constant conversion or value scaling).

For example, on the MIPS architecture, function parameters are passed in registers, while on the x86 architecture, parameters are passed on the stack. For a MIPS-x86 translator to invoke a native function, the x86 calling conventions requires that function parameters be moved from the subject registers to the stack.

Figure 6:
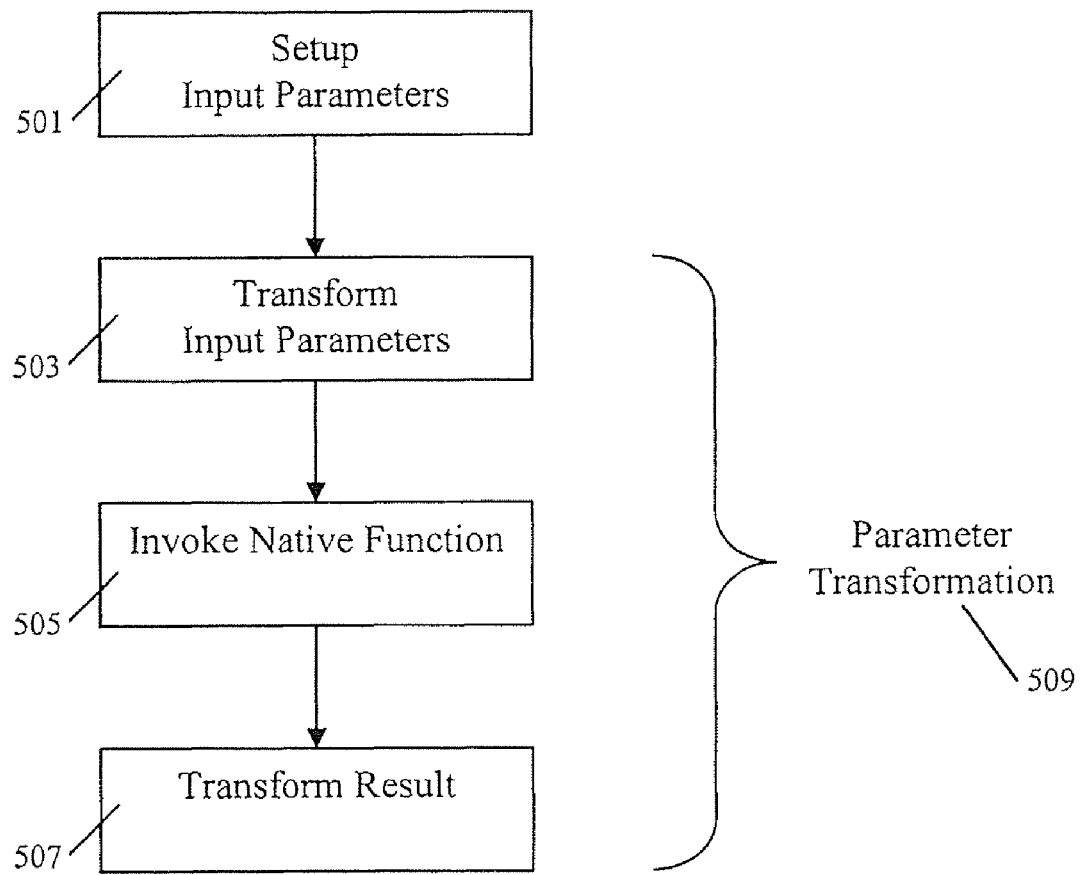
FIG. 6 is a flow diagram illustrating native function invocation in accordance with an illustrative embodiment of the invention.

FIG. 6 illustrates the steps performed by the translator 19 to invoke a native function. In order to invoke a native function, the translator 19 must perform several steps: parameter setup 501; input parameter transformation 503; native function invocation 505; and result transformation 507. Parameter setup 501 refers to the target code 21 which calculates the values of the function call parameters. Input parameter transformation 503 organizes the function call parameter values, from their target code 21 representations, to the format and location that the native function code expects. Native function invocation 505 is the actual function call to the native function, and includes the organization of the (reformatted) parameters into the order required by the function prototype, in a manner complying with the native calling conventions. A function prototype indicates the order and type of the function's parameters, and the type of the function's return value. For example, if the native calling conventions require that arguments be passed on the stack, then target code 21 which invokes a native function must place the arguments on the stack in the correct order and advance the stack pointer accordingly. Result transformation 507 transforms the function's return value if any; the function returns a value in a format consistent with the native architecture, which the translator converts into the representation used by the target code 21.

Parameter setup 501 is not exclusive to the native binding mechanism 22, because the target code 21 must calculate the parameter values regardless of whether the function is invoked as translated subject code 21 or as native code 28. In cases where the translator 19 does not know which particular subject registers a native function call will use (as parameter values), the translator 19 must rectify the values of subject registers used, to ensure that the subject register bank 27 is in a consistent state. Translator optimizations such as lazy evaluation may postpone the calculation of subject register values until those values are needed, where rectification refers to the forced calculation of registers whose evaluation has been deferred. When rectified, subject register values are then stored to the subject register bank 27.

In addition to calculating the values of a function's explicit parameters (which in some cases requires rectification of all subject registers), the parameter setup step 501 must also ensure that the subject memory space is in a consistent state, as native calls may have side effects in the form of memory accesses. In one embodiment, the IR that encodes a native function call (whether to a native call stub or to an underlying native function) rectifies the subject memory state, such that all loads and stores that would occur prior to the function call in the subject program are planted in the target code prior to the native function call, and likewise no memory accesses that should occur after the function call are planted before the native call.

"Parameter transformation" 509 is used to refer to steps 503, 505, and 507 collectively, meaning all of the respective conversion between the different data formats and calling conventions of the target code 21 and native code 28. The code that performs parameter transformation 509 is referred to as a "call stub," which includes a minimal wrapper around the underlying native function call, whose sole purpose is to allow the target code 21 caller to interact with the native code 28 callee. A single "call stub" may therefore be divided into target code 21 and native code 28 components. Whether parameter transformation 509 takes place entirely in target code 21 or partially in native code 28 depends on the implementation of native binding.

Native Code Stubs

In some embodiments, parameter transformation 509 for native binding is performed in part by native code 28. Native code stubs have the disadvantage that they cannot be optimized by the translator 19. In these embodiments, target code 21 performs some parameter transformation and invokes a native call stub, using the native calling conventions. The native code 28 of the call stub then performs additional parameter transformation and calls the underlying native function.

Figure 4:
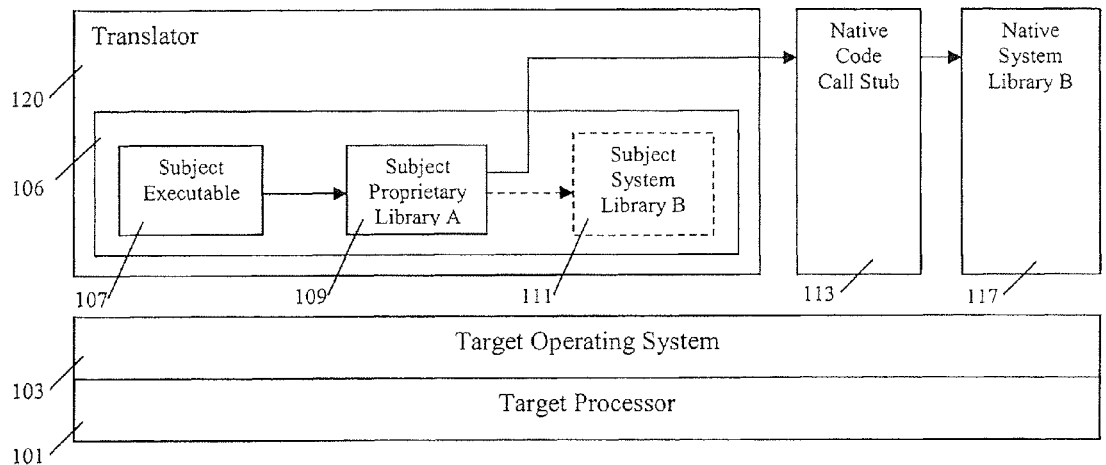
FIG. 4 is a schematic diagram illustrating native binding processes in accordance with an illustrative embodiment of the invention.

FIG. 4 shows a block diagram of the operational flow of function calls in an illustrative embodiment of a translator 120 which uses native binding based on native code call stubs 113. The subject program 106 in this example includes a subject executable 107 and a number of subject libraries, including proprietary libraries 109 and system libraries 111. The translator 120 replaces calls to subject system library functions 111 with calls to native code call stubs 113. The target code 21 which calls the native code call stubs 113 performs parameter transformation. The native code call stubs 113 perform additional parameter transformation and parameter mapping. The native code call stubs 113 then call native system library functions 117.

Native Code Stubs: Uniform Interface

In one embodiment, native code parameter transformation 509 is facilitated by defining a uniform call stub function interface. A uniform call stub function interface defines a fixed function signature for all native call stubs and corresponding data types, which allows the translator 120 to invoke the call stub without any knowledge of the function signature (prototype) of the underlying native function. This allows call stubs to be implemented in a high-level programming language, such as C or C++, which makes the native binding mechanism more accessible to end users of the translator 19.

In this embodiment, the call stub function is compiled as a native code executable which is linked to the translator executable. During execution, the translator 120 invokes the call stub through the uniform interface, using the native calling conventions. Because the call stub interface is uniform, the target code sequence which invokes the call stub is the same for all native calls.

For example, in one embodiment, the uniform call stub interface is a C function which takes exactly two parameters, the subject address of the call site and a reference to a uniform data structure which contains all subject register values, and returns one value, the subject address of the next subject instruction that the translator should execute. The uniform data structure which is passed to the call stub always contains the current values of all subject registers, otherwise referred to as a subject context.

In a native binding mechanism based on the uniform call stub interface, native binding is divided into several components: (i) a special IR node type which rectifies all subject register values; (ii) target code 21 which marshals all subject registers into a uniform context structure and invokes the call stub according to native calling conventions; and (iii) the native call stub which marshals specific subject register values into function parameters and invokes the native function.

During translation, a native call site is translated into a native call IR node. A native call IR node contains dependency references to the IRs of all subject registers. These IR dependencies of the native call IR node guarantee that, in the target code generation phase, the target code corresponding to the subject register values will be generated before the native call. Translator optimizations such as lazy evaluation may postpone the calculation of subject register values until those values are needed. The native call IR dependencies inform the code generation phase that a native call stub "needs" all subject register values. As such, the translator 19 generates target code 21 to rectify all subject register values prior generating target code 21 to invoke a native call stub 113. Likewise, the native call IR node is treated as a memory reference for purposes of code generation, such that all loads and stores which precede the function call in the subject code 17 are (generated and) executed prior to the function call in the target code 21. Similarly, all loads and stores which occur after the function call in the subject code 17 are postponed until after the native call.

If necessary, the translator 19 includes a special abstract register to hold the native call IR. In the IR generation phase of translation, abstract registers serve as placeholders for (i.e., root nodes of) IR trees. IR trees must be linked to an abstract register or else they are not emitted as target code. In other translators, the native call IR node can be attached to an existing abstract register, such as an abstract register for the successor address (of the current block).

The target code 21 to invoke a native call stub 113 rectifies the subject register values and then records them in a subject context structure. Because the native code call stub 113 is implemented by native code 28 in this embodiment, the subject context must be constructed in a representation consistent with the native architecture. As such, the target code 21 performs parameter transformation 503 as necessary to convert the subject register values from a target code representation to a native code representation. The process of converting multiple values into a data structure representation consistent with another architecture is sometimes referred to as marshalling.

The target code 21 constructs a subject context containing native representations of all subject register values. The target code 21 then invokes the native code call stub 113, passing the subject context to it as a parameter. The call stub 113 invokes the underlying native function, extracting the particular subject registers needed from the subject context and passing them to the native function as appropriate parameters. The call stub 113 thus encodes the native function's prototype and defines the mapping of particular subject registers to the corresponding native function parameters.

In some cases, the native function interface may be substantively different than its subject code equivalent, such that additional calculations (beyond the transformations for data representation and calling conventions) must be performed on the subject data to make it suitable for use as a native function parameter. In such cases, the call stub 113 may perform additional parameter transformation on the subject register values. For example, the native function may expect a particular parameter in different units than its subject code equivalent. In this case, the call stub 113 would perform a constant conversion on the appropriate subject register value prior to invoking the native function, to account for the difference in unit type for that parameter.

In embodiments which use a uniform native call stub interface, the target code 21 indiscriminately transforms all subject registers, from the target code representation to a native code representation. The native call stub 113 then extracts the particular (transformed) subject registers required as parameters by the native function's prototype. The native call stub 113 may also perform additional parameter transformations to reflect differences between the subject version and native version of the function being called. Target code 21 adjusts for representation differences between the target code 21 and native code 28, while the call stub 113 accounts for the signature of the particular underlying native function.

In this embodiment, a native binding bind point description identifies a subject function to bind and the corresponding native call stub function, while the identity of the underlying native function to bind to is implicit (i.e., hard-coded) in the call stub implementation.

Native Code Stubs: Compiled Scripts

In another embodiment, native code parameter transformation is implemented using a special purpose native binding programming language (referred to hereafter as "the scripting language"). Before or during execution, the translator 19 parses the scripting language implementation of a call stub and compiles it into a native executable module. The call stub module is then linked in with the translator executable, and the (native) call stub functions are invoked using the native calling conventions, as described above.

Native binding scripts are compiled or interpreted into an executable representation of a call stub. In one embodiment, the bind point descriptions are interpreted by a separate tool, prior to execution of the translator, into executable native code. In another embodiment, the translator itself interprets or compiles the bind point descriptions at run-time, into either executable native code or into translator IR (later generated as target code).

In some embodiments, the scripting language is a special-purpose language which is specific to the translator. The scripting language includes primitives (programming language building blocks) to describe a wide range of possible parameter transformation operations, including: (i) descriptions of data types; (ii) conversion between target code and native representations of those data types; (iii) identification of native functions; (iv) mapping particular subject registers to particular function parameters; (v) memory accesses to the subject program's memory space; and (vi) basic mathematical operations. In an alternative embodiment, the scripting language further includes (vi) basic logical operations and (vii) global storage of temporary values across multiple native binding scripts. The implementation of these primitives (i.e. the native code generated from the scripts, by the translator or by a special tool) must be consistent with the representation and calling conventions of the target architecture.

In this embodiment, a native binding bind point description identifies a subject function to bind and the corresponding native call stub function, while the identity of the underlying native function to bind to is hard coded in the scripting language implementation of the call stub.

Target Code Stubs

In another embodiment, parameter transformation for native binding is performed entirely in target code. In this embodiment, the translator 19 detects native binding calls at decode-time and encodes the parameter transformations as IR trees (which are ultimately generated as target code). By representing the parameter transformations and details of the native function prototype in IR, the call stub code becomes integrated into the subject code (IR of a call stub is indistinguishable from IR of subject code). This allows the translator to apply optimizations (e.g., group blocks) to the parameter transformation code. In contrast, parameter transformations performed in native code, such as the mapping of subject registers to function parameters performed in native code call stubs (described above), are external to the translator and cannot be optimized.

Figure 5:
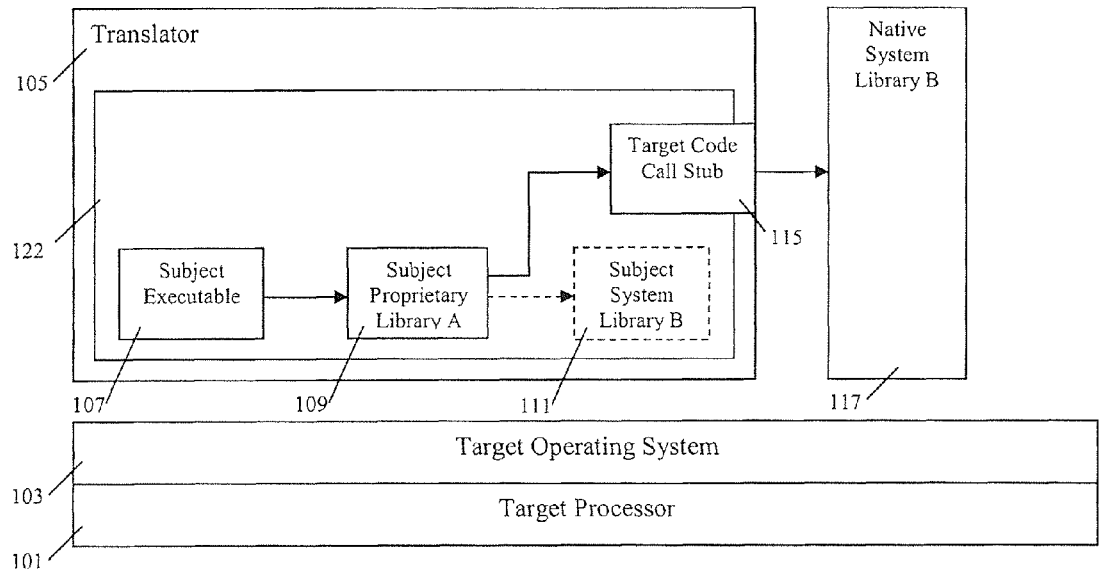
FIG. 5 is a schematic diagram illustrating native binding processes in accordance with an illustrative embodiment of the invention.

FIG. 5 shows a block diagram of the operational flow of function calls in an illustrative embodiment of a translator 122 which uses native binding based on target code call stubs 115. The subject program 106 consists of a subject executable 107 and a number of subject libraries, which may include proprietary libraries 109 and system libraries 111. The translator 122 replaces calls to subject system library functions 111 with target code call stubs 115. The target code call stubs 115 perform parameter transformation and parameter mapping, and then call functions in a native system library 117.

In embodiments of the translator 122 employing target code call stubs 115, where target code 21 invokes the bound native function directly, all parameter transformations and parameter mappings are performed by target code 21. In these embodiments, target code 21 accounts for both representation transformations and the signature of the particular native function (i.e., the mapping of particular subject registers to the corresponding native function parameters). In order for target code 21 to perform parameter mapping, the translator 122 must know the native function prototype and subject register-to-parameter mappings during translation.

In some cases, the target code call stub 115 is translated in a separate block from the target code 21 which invokes it ("caller target code"). In other cases, the target code call stub 115 is translated in the same block as the target code 21 which invokes it, which allows the call stub code to be integrated with and optimized with the caller target code, referred to as an "early binding" mechanism. In cases where the subject program calls a particular subject function from many call sites, it is disadvantageous to inline the target code call stub 115 at every call site, because excessive memory is consumed by the resulting duplication of call stub code. In such cases, the translator 122 maintains the target code call stub 115 as a separate block which each translated call site invokes, rather than inlining the call stub at every call site. One optimization of native binding is to use early binding (i.e., inline call stubs) only in blocks which are very frequently executed.

Target Code Stubs: Schizo Calls

In another embodiment, the translator 19 employs a mechanism referred to as Schizo calls or "S-calls", where target code parameter transformation is facilitated by extending the subject instruction set to include translator-specific native binding instructions (called S-Call Commands) which are inserted into the subject code when the subject code unit is compiled. When the translator 19 decodes the subject code, it detects and interprets these S-Call Commands, and plants the appropriate IR (or target code) to perform parameter transformation.

The S-call mechanism requires support from the developers of the subject program. When the subject program is compiled, the S-call commands are encoded in the compiled subject program as subject instructions. The call stubs describing the call to the native function are not constrained to only contain S-Call commands they may include regular, legal subject instructions to aid the parameter transformation. In combination the S-call commands and the regular subject instructions encode all information and operations required for parameter transformation.

In one embodiment, S-call commands are encoded in variable length instructions constructed from multiple sub-components, such that one S-Call command instruction may be larger than a regular subject code instruction and may even be the size of multiple regular subject instructions. The S-call command begins with a sub-component which identifies the instruction as an S-Call command and which is known to be interpreted as an illegal instruction on the subject architecture, referred to as Schizo Escape. The Schizo Escape sub-component may optionally further identify the type of command contained within the S-Call command. S-call commands are preferably divided into five types of command classes: (1) marker, (2) parameter, (3) call, (4) copy, and (5) nullify. The class of the S-call command is encoded in unused bits of the leading Schizo Escape sub-component. The Schizo Escape is followed by a combination of class-specific options and/or arguments, each of which has a predefined opcode and format, and each of which is encoded as one or more words (i.e., four-byte units) in the S-call Command instruction The S-call command instruction ends with a sub-component that is a repetition of the initial Schizo Escape. The above-noted five types of S-Call Commands are described in greater detail below, while it is understood that it is the full intention of the inventors of the present invention that other types of translator-specific native binding instructions may also be used as S-Call Commands other than the above-listed five types.

S-call "marker" commands are optional markers used to allow application binary interface (ABI) specific optimizations. S-call marker commands indicate the subject code 17 range (start and end addresses) containing translator specific code (e.g. the call stub to a native function), which may or may not coincide with the full extent of a subject function. S-call marker commands are of two types: start and end. An S-call marker command has one string argument, assigning a name to the marked point (e.g. the name of the subject function being bound).

S-call "parameter" commands identify a value to be used as a native function parameter and encode the appropriate parameter transformation for that value. In one embodiment, each S-call parameter command defines the "next" parameter for the function call, by pushing the corresponding value onto the stack, requiring S-call parameter commands to therefore be in order corresponding to the function prototype.

S-call "call" commands encode the actual function call to the native function. S-call call command arguments include the location to store the function's return value, and either the name, the absolute address or the location of the address in the subject machine state of the function being called.

S-call "copy" commands encode the operation of copying a value to or from a subject register or subject memory location and performing transformation between target code and native representation.

S-call "nullify" commands invalidate the instructions they follow. They are used in conjunction with unconditional branches, as described below, to allow proper execution of the subject program when running natively and still allow the translator to identify and interpret translator specific pieces of code.

During translation, the translator 19 detects the Schizo Escape and decodes the S-call commands into IR representations of the corresponding parameter transformation and native function call operations. The translator 19 integrates the parameter transformation IR into the IR forest of the current block, which is subsequently generated as target code. Encoding the parameter transformation operations into an IR allows the parameter transformation code to be integrated into and optimized with the IR encoding the subject code.

S-call commands are encoded in the subject program using leading instruction opcodes, the Schizo Escape, which only the translator 19 understands, since S-call commands are translator-specific native binding instructions. Subject processors interpret S-call commands as illegal subject instructions. As such, the execution of S-call commands must be avoided when the subject program is running natively (i.e., on the subject architecture). The subject program software developers can use multiple methods to allow S-call-enhanced subject programs to run natively, including (a) conditional execution and (b) branch lookahead parsing. Conditional execution consists of conditional subject code which checks whether the subject program is running natively or as a translated program, based on the run-time environment, and which skips the S-call commands if running natively. Branch lookahead parsing consists of unconditional branch instructions which are planted in the subject code to skip all translator specific instructions (such as, but not limited to, S-call commands). When running natively, the unconditional branches are executed thereby skipping the translator specific code. When running as a translated program, the translator disregards any unconditional branch instruction which is followed by an S-call nullify command (i.e., the unconditional branch is part of the subject instruction pattern used by the translator to identify translator specific code in decoding).

Target Code Stubs: External Schizo Stubs

In another embodiment call stubs comprised of Schizo-call commands and ordinary subject instructions are located in separately compiled units of subject code. The special purpose native binding bind point description language (as described above) is used by the translator 19 to specify subject code locations as bind points. When the translator 19 reaches such a bind point, the flow of control is diverted to execute an external schizo stub instead. From this point onwards the behavior of the translator is identical to the behavior described for Schizo Calls. External Schizo stubs allow the use of S-Call commands when it is not possible to insert S-Call commands into the subject code directly (e.g. when the source code for the subject library/application is not available).

Target Code Stubs: Interpreted Scripts

In an alternative embodiment, target code parameter transformation is facilitated by a special purpose native binding implementation language ("the scripting language"), as described above. In this embodiment, at run-time the translator interprets the native binding script into an IR representation of parameter transformation. The translator integrates the parameter transformation IR into the IR forest of the current block, which is subsequently optimized and generated as target code. Such translators must contain a front-end component that can parse and decode the scripting language.

In this embodiment, a native binding bind point description identifies the subject function to bind and the corresponding native call stub function, while the identity of the underlying native function to bind to is hard coded in the implementation of the call stub.

Target Code Stubs: Uniform Interface

In an alternative embodiment, target code parameter transformation is facilitated by defining a uniform call stub function interface, as described above. A uniform call stub function interface defines a fixed function signature for all native call stubs and corresponding data types, which allows the translator to invoke the call stub as a native function without any knowledge of the function signature (prototype) of the underlying native function. This allows call stubs to be implemented in a high-level programming language such as C or C++, which makes the native binding mechanism more accessible to end users of the translator.

In contrast to the native code uniform call stub interface described above, in some embodiments the translator parses the call stub implementation at run-time and interprets it into an IR representation of parameter transformation. In other words, the translator compiles call stub implementations into translator IR. The translator integrates the parameter transformation IR into the IR forest of the current block, which is subsequently optimized and generated as target code. Such translators must contain a front-end component that can parse and decode the high-level programming language, similar to a compiler.

In this embodiment, a native binding description identifies the subject function to bind and the corresponding native call stub function, while the identity of the underlying native function to bind to is hard coded in the implementation of the call stub.

The invention claimed is:

1. A method of translating subject program code executable by a subject processor into target program code executable by a target processor, said method comprising:
   (a) dividing the subject program code into a plurality of subject program code units;
   (b) translating one or more of the subject program code units into one or more target program code units using a translator executing on the target processor interleaved with execution of the target program code by the target processor; and (c) executing the one or more target program code units on the target processor;

wherein the step (b) further comprises dynamically identifying, by the translator at run-time while the target program code is executing on the target processor, whether at least one of the subject program code units has a corresponding native code unit which is executable natively by the target processor, and, if so, identifying the native code unit which corresponds to the identified subject program code unit, wherein the identified subject program code unit corresponds to a subject function and the identified native code unit corresponds to a native function; and wherein the step (c) further comprises executing the corresponding native code unit instead of executing a translated version of the identified subject program code unit comprising:

transforming in target code all subject register values from the target code representation to the native code representation;

invoking from target code a native code call stub function with the transformed subject register values according to a uniform call stub interface; and invoking from the native code call stub function the native function with particular subject register values and/or parameter stack according to a prototype of the native function.

2. The method of claim 1, wherein:

in the step (b), dynamically replacing a call in the subject program code to the identified subject function instead with a call to the corresponding native function; and in the step (c), executing the native function instead of executing a translated version of the subject function.

3. The method of claim 2, wherein the step (c) comprises:

transforming zero or more function parameters from a target code representation to a native code representation;

invoking the native function with the transformed function parameters according to the prototype of the native function; and transforming zero or more return values of the invoked native function from a native code representation to a target code representation.

4. The method of claim 3, wherein at least one of the transformations in the transforming steps generates an intermediate representation of the transformation.

5. The method of claim 3, wherein at least one of the transformations in the transforming steps generates target code.

6. The method of claim 3, wherein the step (c) comprises:

transforming a function parameter from a target code representation to a native code representation;

invoking the native function with the transformed function parameter according to a prototype of the native function; and transforming a result of the invoked native function from a native code representation to a target code representation.

7. The method of claim 3, wherein the function parameter transforming step and the native function invoking step are described in subject code by translator specific instructions added to the subject instruction set.

8. The method of claim 1, wherein the steps of identifying the certain subject code unit and its corresponding native code unit are performed using a bind point description.

9. The method of claim 8, wherein the bind point description includes a subject function definition and a native function definition, wherein the subject function definition identifies the certain subject program code unit having a corresponding native code unit and the native function definition identifies the corresponding native code unit.

10. The method of claim 9, further comprising inserting in the target code a call stub to the native function during translation of the subject code when encountering the subject function contained in the bind point description.

11. The method of claim 8, wherein the bind point description is embedded within a translator performing the translation.

12. The method of claim 8, further comprising reading the bind point description from a stored bind point description file at the beginning of translation execution.

13. The method of claim 8, wherein the bind point description includes a location in the subject code and a corresponding native function, wherein the location in the subject code identifies the certain subject program code unit having corresponding native code and the native function identifies the corresponding native code unit.

14. The method of claim 1, wherein the bind point description includes a location in the subject code and a reference to code to be invoked, wherein the location in the subject code identifies the certain subject program code unit having corresponding native code and the reference to code to be invoked identifies the corresponding native code unit.

15. The method of claim 14, wherein the code to be invoked is target code.

16. The method of claim 8, wherein the bind point description includes a native function call which is inserted in the target code either before, after, or in place of a subject function call.

17. The method of claim 8, further comprising the step of performing runtime symbol patching comprising:

encoding subject-to-native function mappings in a symbol table of the subject program, replacing entries in the symbol table of the subject program with special native binding markers, and interpreting the special native binding markers when encountered during translation as bind point descriptions to identify an appropriate native function to call.

18. The method of claim 1, further comprising:

parsing and decoding a native binding implementation scripting language containing native binding scripts;

interpreting the native binding scripts during translation; and generating an intermediate representation of the native binding scripts to transform a function parameter from a target code representation to a native code representation.

19. The method of claim 18, further comprising:

integrating the intermediate representation of the native binding scripts into an intermediate representation forest for a block of subject code; and generating target code for the intermediate representation forest.

20. The method of claim 1, further comprising:

transforming in target code all subject register values from a target code representation to a native code representation;

invoking from target code a native code call stub function with the transformed subject registers according to a uniform call stub interface;

interpreting the native code call stub function; and generating an intermediate representation of the native code call stub function binding scripts to transform a function parameter from a target code representation to a native code representation.

21. The method of claim 20, further comprising:
integrating the intermediate representation of the native code call stub function into an intermediate representation forest for a block of subject code; and
generating target code for the intermediate representation forest.

22. The method of claim 3, wherein the native function executing step further comprises:
transforming in target code all subject register values from the target code representation to the native code representation;
invoking from target code a native code call stub function with the transformed subject register values;
invoking from the native code call stub function the native function with particular subject register values and/or parameter stack according to the prototype of the native function.

23. The method of claim 1, further comprising:
parsing a scripting language implementation of a native code call stub function;
compiling the parsed native code call stub function into a native code executable module; and
linking the native code executable module with an executable for performing the translation.

24. The method of claim 23, wherein the native code executable module is executable for:
transforming in target code all subject register values from the target code representation to the native code representation;
invoking from target code a native code call stub function with the transformed subject registers; and
invoking from the native code call stub function the native function with particular subject registers and/or parameter stack according to the prototype of the native function.

25. The method of claim 23, wherein the steps of identifying the certain subject code unit and its corresponding native code unit are performed using a bind point description, said bind point description including a subject function and a native code call stub function, wherein the subject function identifies the certain subject program code unit having the corresponding native code unit and the native code call stub function identifies the corresponding native code unit.

26. The method of claim 25, further comprising encoding the identity of the native function of the native code call stub function in the scripting language implementation of the native code executable module.

27. The method of claim 3, wherein the native function executing step further comprises:
transforming in target code all subject register values from the target code representation to the native code representation;
invoking from target code a target code call stub function with the transformed subject registers; and
invoking from the target code call stub function the native function with particular subject registers and/or parameter stack according to the prototype of the native function.

28. The method of claim 27, further comprising:
generating an intermediate representation of the native function executing step;
integrating the intermediate representation of the native function executing step into an intermediate representation forest for a block of subject code; and
generating target code for the intermediate representation forest.

29. The method of claim 1, wherein the identified subject code unit to be executed is a system call.

30. The method of claim 1, wherein the identified subject code unit to be executed is a library function.

31. A computer-readable storage medium having translator software resident thereon in the form of computer-readable code executable by a computer to translate subject program code executable by a subject processor into target program code executable by a target processor, wherein the translator software performs the steps of:
(a) dividing the subject program code into a plurality of subject program code units;
(b) translating one or more of the subject program code units into one or more target program code units using a translator executing on the target processor interleaved with execution of the target program code by the target processor; and
(c) executing the one or more target program code units on the target processor;
wherein the step (b) further comprises dynamically identifying, by the translator at run-time while the target program code is executing on the target processor, whether at least one of the subject program code units has a corresponding native code unit which is executable natively by the target processor, and, if so, identifying the native code unit which corresponds to the identified subject program code unit, wherein the identified subject program code unit corresponds to a subject function and the identified native code unit corresponds to a native function; and
wherein the step (c) further comprises executing the corresponding native code unit instead of executing a translated version of the identified subject program code unit comprising:
transforming in target code all subject register values from the target code representation to the native code representation;
invoking from target code a native code call stub function with the transformed subject register values according to a uniform call stub interface; and
invoking from the native code call stub function the native function with particular subject register values and/or parameter stack according to a prototype of the native function.

32. A computer apparatus, comprising:
a target processor; and
a memory arranged to store a subject program code executable by a subject processor, and a translator code to translate the subject program code into a target program code that is executed by the target processor, including performing the steps of:
(a) dividing the subject program code into a plurality of subject program code units;
(b) translating one or more of the subject program code units into one or more target program code units using a translator executing on the target processor interleaved with execution of the target program code by the target processor; and (c) executing the one or more target program code units on the target processor;

wherein the step (b) further comprises dynamically identifying, by the translator at run-time while the target program code is executing on the target processor, whether at least one of the subject program code units as having a corresponding native code unit which is executable natively by the target processor, and identifying the native code unit which corresponds to the identified subject program code unit, wherein the identified subject program code unit corresponds to a subject function and the identified native code unit corresponds to a native function; and wherein the step (c) further comprises executing the corresponding native code unit instead of executing a translated version of the identified subject program code unit comprising:

transforming in target code all subject register values from the target code representation to the native code representation;

invoking from target code a native code call stub function with the transformed subject register values according to a uniform call stub interface; and invoking from the native code call stub function the native function with particular subject register values and/or parameter stack according to a prototype of the native function.

* * * * *